No. 772,213. PATENTED OCT. 11, 1904.
H. CARBONNELLE.
ELECTRIC OR TELEPHONIC TRANSMISSION.
APPLICATION FILED JULY 20, 1904.
NO MODEL.
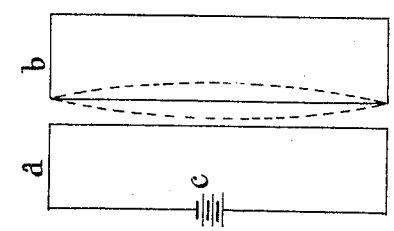
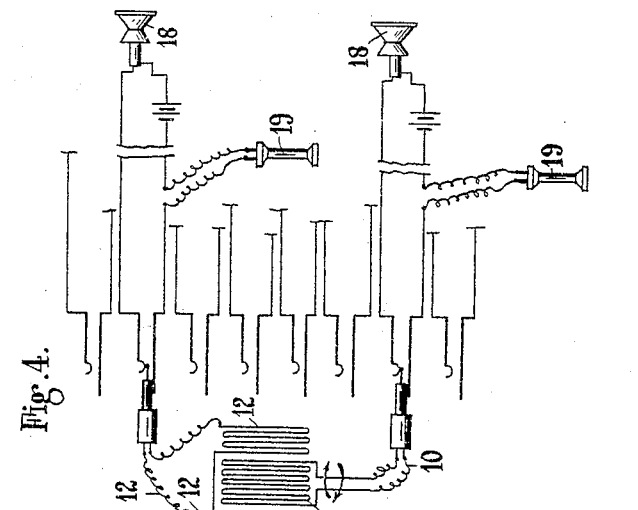
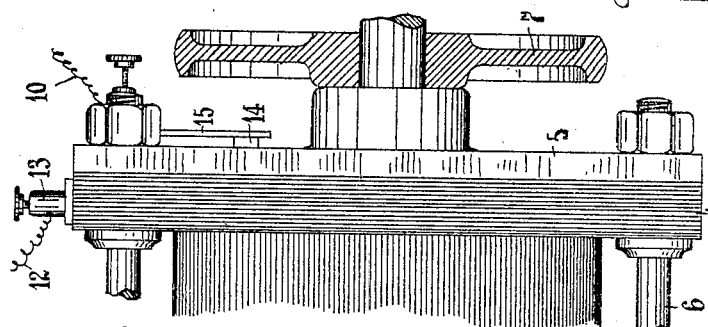
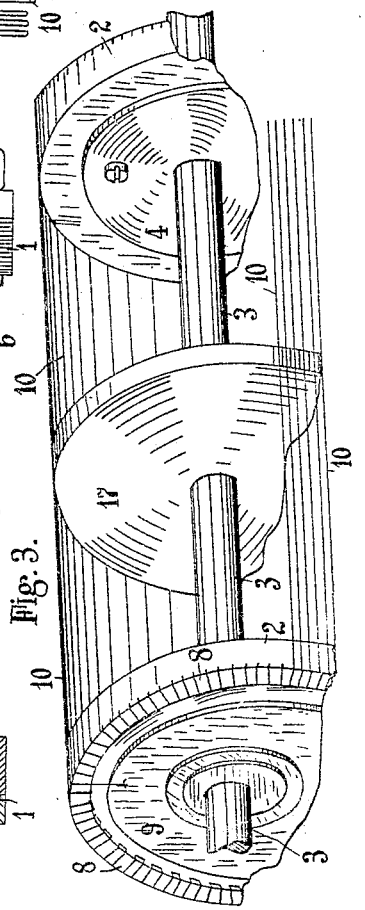
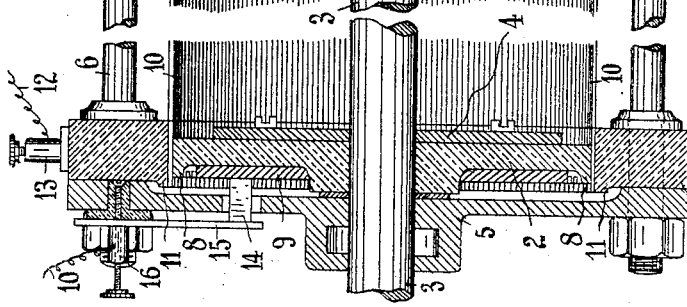
Witnesses
George G. Schoenlank
Thomas Kirkpatrick
Inventor
Henri Carbonnelle
by H. van Ostenneel
Attorney No. 772,213.

Patented October 11, 1904.

UNITED STATES PATENT OFFICE.

HENRI CARBONNELLE, OF UCCLE, NEAR BRUSSELS, BELGIUM.

ELECTRIC OR TELEPHONIC TRANSMISSION.

SPECIFICATION forming part of Letters Patent No. 772,213, dated October 11, 1904.

Application filed July 20, 1904. Serial No. 217,405. (No model.)

*To all whom it may concern:*

Be it known that I, HENRI CARBONNELLE, a subject of the King of Belgium, residing at Uccle, near Brussels, Belgium, have invented a new and useful Improvement in Electric or Telephonic Transmission; and I do hereby declare the following to be a full, clear, and exact description of the same.

My present invention relates to telephone transmission, and has for its object to provide an improved relay intended to be inserted at the central station into the telephonic lines to be interconnected for the purpose of transmitting and increasing undulatory electric currents.

The principle evolved by my invention is as follows: Suppose two circuits $a$ and $b$, Figure 1, one, $a$, of which receiving a constant current generated by a source of electricity $c$ and the second circuit, $b$, being moved parallel to the former. It is well known that these movements produce alternate induction-currents in the circuit $b$. When the successive movements of the circuit $b$ are produced with sufficient speed, the intensity of the induced currents can become higher than the intensity of the current passing through the circuit which occurs in any alternate-current-producing machine. Again, when the reciprocations of the circuit $b$ are brought to a number of fifty thousand to sixty thousand in a second through suitable mechanical or other means the induced alternate currents will succeed so speedily that a telephonic receiver remains insensible at the passage of said currents. On the other hand, when the intensity of the circuit $a$ is changed during the movements of the circuit $b$—for instance, by means of a microphone—such changes will be increased in a receiver inserted into $b$ in proportion to the rate of speed of the circuit $b$.

Heretofore similar devices have been invented in which the electromagnets of an electromagnetic machine are inserted into a telephonic circuit for the purpose of increasing the transmitted sounds. However, these devices are objectionable in that they are not capable of transmitting increased sounds in any direction and that collecting-segments are required for the operation.

With the above-named and other objects in view my invention consists of the construction, arrangement, and combination of parts fully described and claimed hereinafter.

In the accompanying drawings, Fig. 1 shows the diagram already referred to for the explanation of the principle evolved by my invention. Fig. 2 is a side view with a partial longitudinal section of the increasing-relay. Fig. 3 is a broken perspective view of the rotary inner disks, showing the winding thereof on a larger scale. Fig. 4 is a diagram showing the arrangement of the relay on the central station.

Referring more particularly to the drawings, 1 1 represent two stationary plates made of any suitable insulating material and provided with central circular openings, in which the rotary disks 2 2 are arranged to be freely rotated. The disks 2 2 are secured by means of metal plates 4 on a shaft 3, rotating in suitable bearings arranged on the metal side plates 5 5 and to which movement is imparted through the agency of a belt-pulley 7. The metal plates 5 5 are secured to the stationary plates 1 1 by means of screw-nuts screwed onto the rods 6, connecting said stationary plates. Each one of the rotary disks 2 is provided on its outer face with a projecting rim 8, having radial saw-notches, Fig. 3—say four per millimeter—for the purpose of receiving the wire 10, having preferably a diameter of a tenth-millimeter.

The inner winding-wire is arranged as follows: To the outer faces of the rotary disks 2 2 are secured metal disks 9 9. Connected to the metal disk 9 of one rotary disk 2 is one end of the winding-wire 10, extending therefrom through the next saw-notch and over the left rotary disk to the right rotary disk, on which the wire extends through the corresponding saw-notch under the projecting rim 8, where said wire is suitably bent to extend upwardly again through the adjacent saw-notch and over the right stationary disk back to the left rotary disk and under the projecting rim thereof, where it is again bent to extend upwardly to the adjacent saw-notch back to the right rotary disk, and so on, until the winding is completed, whereupon the other end of the wire is soldered on the metal plate 9 of the second rotary disk. In this way a zigzag-like winding is obtained, the windings of which are very close together. The outer winding on the inner surface of the stationary plates 1 1 is arranged similarly, and to this end said stationary plates 1 1 are provided with circular projecting rims 11, having corresponding saw-notches for the purpose of receiving and maintaining the outer winding-wire, the ends of which are connected to terminals 13 13, arranged on said stationary plates, as shown in Fig. 2. The winding-wire of the rotary disks is electrically connected to one line through the medium of slide-contact devices 14 15 and terminals 16, whereby a constant connection is secured in contradistinction to the collecting-segments required in similar devices.

For the purpose of supporting the inner winding the shaft 3 may be provided with a suitable insulating disk-plate 17, on which the wire may be secured by means of a strip of silk or the like. (Not shown.) Both winding-wires are preferably coated with a thin layer of insulating-varnish.

It is easily comprehensible that the two circuits constructed in the manner described permit of a rapid succession of N and S poles— say two + (N) and two − (S) poles per millimeter of the inner and outer windings. Therefore the apparatus forms an alternate-current machine of a special kind. Now when the rotary winding is rotated at a linear speed of fifteen meters per second the current produced in the stationary winding will have $15,000 \times 4 = 60,000$ vibrations per second, provided that the induction-current is constant in accordance with the above-stated principle. This occurs when the microphones 18, connected to each other at the central station, (see Fig. 4,) are in state of rest, whereby the induced alternate current does not sensibly influence the vibrating plates of the telephonic receivers 19 19. However, when the plate of one of the microphones 18 is vibrated the resistance of the inductor-circuit (rotary or stationary) will be changed thereby, and these changes of resistance are increased through the apparatus described and transmitted to the receiver 19.

It will be seen that in my improved arrangement both the stationary and the rotary windings may act as an inductor, whereby the apparatus is adapted to increase and transmit telephonic currents in either direction.

Having fully described my invention, what I claim, and desire to secure by Letters Patent, is—

1. In an apparatus for increasing and transmitting undulatory electric currents, the combination with two stationary plates of insulating material, central openings in said plates, rigid connections between the same, a zigzag winding on the inner surfaces of said plates having the wires close together, and suitable electric connections between said winding, and a telephonic line-wire, of two rotary insulating-disks in said central openings of the stationary plates, a zigzag winding on the outer surfaces of said rotary disks, electric connections between said winding and a second telephonic line-wire, and means for rotating said rotary disks at a suitable speed, substantially as described.

2. In an apparatus for increasing and transmitting undulatory electric currents, the combination with two stationary plates of insulating material, central openings in said plates, rigid connections between the same, a zigzag winding on the inner surfaces of said plates having the wires close together, and suitable electric connections between said winding and a telephonic line-wire, of two rotary insulating-disks in said central openings of the stationary plates, a shaft carrying said rotary disks, bearings carried by the stationary plates for said shaft, and means for rotating said shaft at a suitable speed, a zigzag winding on the outer surfaces of said rotary disks, metal plates secured to the side faces of said disks and onto which the ends of the inner winding are soldered, suitable slide-contacts sliding on said metal plates and connected with the ends of a second line-wire, substantially as and for the purpose set forth.

In testimony whereof I have signed this specification in the presence of two subscribing witnesses.

HENRI CARBONNELLE.

Witnesses:
 CHARLES HOWARD,
 GREGORY PHELAN.